R. H. MARTIN.
QUICK DETACHABLE COUPLING.
APPLICATION FILED JUNE 19, 1918.
1,287,385.
Patented Dec. 10, 1918.
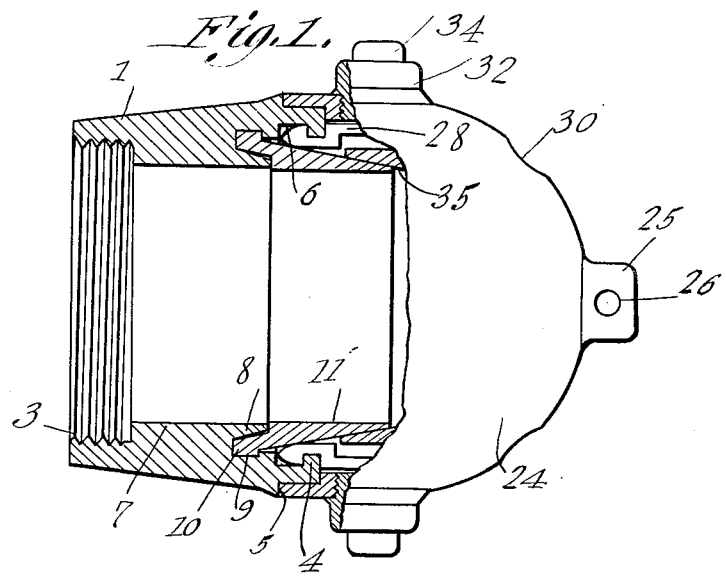
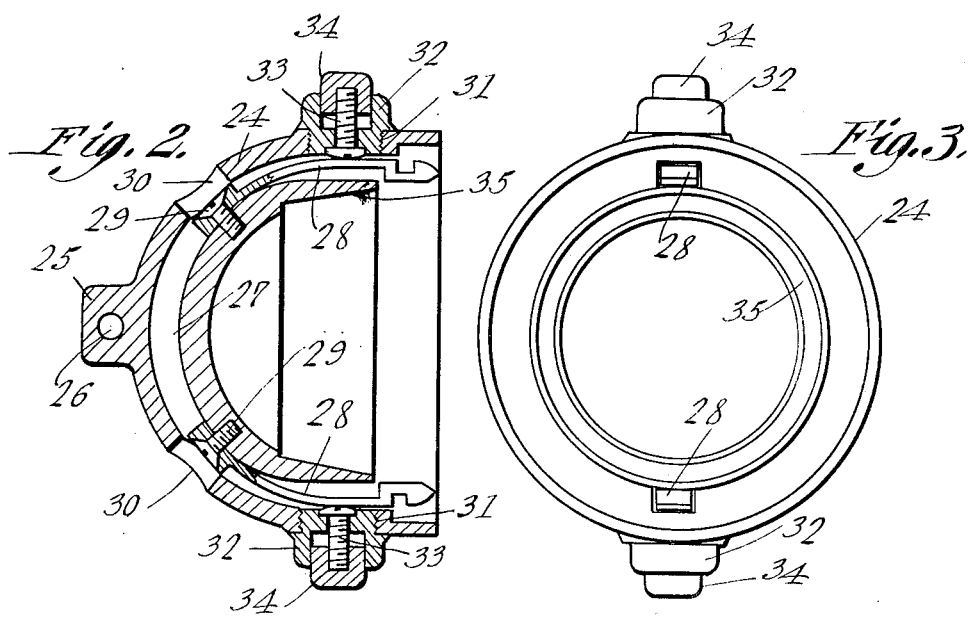
R. H. Martin, Inventor
Witness
By C. A. Snow & Co., Attorneys

UNITED STATES PATENT OFFICE.

RICHARD HARRISON MARTIN, OF GAINESVILLE, GEORGIA.

QUICK-DETACHABLE COUPLING.

1,287,385.  Specification of Letters Patent.  Patented Dec. 10, 1918.

Application filed June 19, 1918. Serial No. 240,879.

*To all whom it may concern:*

Be it known that I, RICHARD H. MARTIN, a citizen of the United States, residing at Gainesville, in the county of Hall and State of Georgia, have invented a new and useful Quick-Detachable Coupling, of which the following is a specification.

The subject of this invention is a quick detachable coupling such as is used for attaching sections of hose and the like.

The main object of the invention is the provision of quick detachable means for securing the members of a coupling together.

A further object of the invention is the provision of means for releasing the coupling locking elements.

A still further object of the invention is the provision of a flexible telescoping element and a seat for such element.

A further object of the invention is the provision of a cap or plug for closing a discharge orifice.

The invention also contemplates generally improving the construction and enhancing the utility of quick detachable couplings.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a view in elevation, partly in section, of a device constructed in accordance with the invention;

Fig. 2 is a sectional view of the cap or plug;

Fig. 3 is a view in elevation of the same.

Referring to the drawing by numerals of reference:—

In carrying out the invention, two coöperating coupling members, 1 and 24, are provided. Internal threads 3 are formed at one end of the member 1 for the purpose of threading the member on a discharge nipple or the like. The coupling end of the member 1 is reduced, as at 4, to provide a shoulder 5 which extends circumferentially of the member and faces the coupling end. Within this end is formed an annular groove 6 for the reception of the resilient catches, as will be set forth, and spaced from this groove, within the member 1, is an annular flange 7 formed with an integral tapering nipple 8 which extends toward the coupling end of the member.

The interior wall of the member 1 is formed, beneath the nipple 8 and adjoining the flange 7 to provide an annular groove 9 which is adapted to receive and form a seat for the flanged end 10 of a flexible telescoping member or nipple 11.

The cap or plug for closing a discharge nozzle or orifice consists in a substantially hemispherical body 24, formed with a central, outwardly projecting boss 25 which may be provided with an aperture 26 for the reception of a chain or other attaching element, not shown.

The cap is cored to provide the longitudinally extending, semi-circular channel 27 in which are positioned the resilient latches 28 which serve to bind the cap in place on a coupling member, the coupling end of which is formed as the member 1 heretofore described. The resilient latches 28 are held in place in the channel by means of screws 29 or the like, and apertures 30 may be provided for the purpose of inserting the screws or removing the same.

Apertures 31 are also formed in the cap and communicate with the channel 27 at diametrically opposite positions, and these apertures are threaded to receive the threaded ends of plugs 32. The plugs 32 are provided with central openings the inner ends of which are enlarged or countersunk to form recesses for the heads of screws 33, which screws extend through the central openings and on the outer ends of which are threaded buttons 34 which have a close sliding fit in the enlarged outer ends of the central openings. As will be seen the heads of the screws 33 rest upon the resilient latches 28 and, by pressing inwardly upon the buttons 34, the latches are forced to a position to release the cap from the coupling member to which it may be attached.

The inner wall of the cap is reamed or countersunk to form a seat 35 for the reception of the flexible nipple 11.

It is thought that, from the foregoing, the operation of the device will be thoroughly understood without a special and detailed description thereof.

Having thus described the invention, what is claimed as new and sought by Letters Patent, is:—

1. A quick detachable coupling, including a coupling member having a recess therein, a flexible nipple within the member, a cap adapted to fit the member, a seat in the cap for the flexible member, resilient latches in the cap and adapted to engage the recess, and opposed buttons for releasing the latches to disengage the cap from the member.

2. A quick detachable coupling, including a coupling member having a recess therein, a nipple in said member, a cap adapted to fit the member, said cap provided with a channel, resilient latches secured in the channel, said latches adapted to engage the recess to lock the cap to the member, a seat formed in the cap for the reception of the nipple, and means for moving the latches to disengage them from the recess and release the cap.

In testimony that I claim the foregoing as my own, I have hereto affixed my signature in the presence of two witnesses.

RICHARD HARRISON MARTIN.

Witnesses:
  H. H. PERRY,
  C. E. SMITH.